United States Patent Office 3,556,972
Patented Jan. 19, 1971

3,556,972
DEPOSITING A POLYMER FROM AN EMULSION BY ELECTROPHORESIS
Jerry T. Seitz, Midland, Mich., assignor to The Dow Chemical Company, Midland, Mich., a corporation of Delaware
No Drawing. Filed Sept. 5, 1968, Ser. No. 757,794
Int. Cl. B01k 5/02
U.S. Cl. 204—181                            10 Claims

ABSTRACT OF THE DISCLOSURE

An article is provided with a coating of a dicarboxylic acid of a block copolymer of α-methyl styrene and an aliphatic conjugated diolefin such as 1,3-butadiene by disposing the article to be coated as an anode in an aqueous electrodeposition bath, charging the electrodeposition bath with an aqueous emulsion containing the dicarboxylic acid block copolymer and a neutralizing agent such as potassium hydroxide, and applying a voltage between the article and a cathode disposed within the electrodeposition bath to cause current flow through the bath and thereby electrodeposit the dicarboxylic acid block copolymer on the article.

---

This invention relates to the art of electrophoresis. In one aspect, this invention relates to methods of electrodepositing film-forming polymeric materials from an emulsion in an aqueous bath characterized by having the polymeric materials disposed in the bath in the form of suspended particles which are insoluble in the bath medium. In another aspect, this invention relates to electrodeposition bath compositions for electrodepositing a polymeric material on a substrate which has been suspended as an anode in an electrodeposition bath.

The prior art methods of applying polymer coatings by electrodeposition almost without exception require that the polymer be present in solution in the electrodeposition bath in order to obtain satisfactory results. A somewhat popular polymer which is electrodeposited by this prior art technique is a polycarboxylic acid resin in the form of a coupled drying oil such as, for example, linseed oil joined or coupled by means of an olefinic acid or anhydride such as maleic anhydride. According to the teachings of the prior art, this polycarboxylic acid resin is dissolved in an electrodepositing bath and neutralized with a water-soluble amino compound. While these coupled drying oils will electrodeposit under the influence of a direct current in an electrodepositing bath, they exhibit poor throwing power in that they accumulate in areas of high voltage such as are present at the corners of the articles which are to be coated. Another shortcoming associated with the electrodeposition of the coupled drying oils of the prior art is that the ester linkages present in the coupled drying oils are easily hydrolyzed in the alkaline medium present in the electrodepositing bath. The coupled drying oils are also inferior in terms of providing uniform and reproducible coatings between batches because it is impossible to reproduce exactly the structure of the coupled oils when they are prepared for electrodeposition.

Attempts to electrodeposit polymeric materials from an emulsion such as an aqueous latex or similar water-reducible dispersion wherein the polymeric material is in the form of a colloidal suspension have not been successful because the particles deposit unevenly in areas of high voltage due to their poor throwing power. It has thus been heretofore impossible to satisfactorily electrodeposit a polymeric material from an aqueous latex bath or emulsion because of the difficulty in regulating and obtaining an even coating. Thus, although there are polymers which can be electrodeposited from solution with moderate success, prior to this invention there did not exist a satisfactory method for electrodepositing a polymer material from an aqueous latex or emulsion to produce a satisfactory product.

According to this invention, a uniform and predictable coating of a polymer material can be obtained on a substrate by an electrophoresis technique when the polymer material is present in the electrodeposition bath in the form of a colloidal suspension. The polymer material which lends itself to electrodeposition from a colloidal suspension in an aqueous latex bath or emulsion according to the teachings of this invention is a dicarboxylic acid of a block copolymer of α-methylstyrene and an aliphatic conjugated diolefin. The carboxylic acid groups are located on the ends of the block copolymer chains. At least some of the acid groups on the block copolymer are neutralized in the aqueous bath by means of a suitable neutralizing agent such as, for example, an alkali metal such as sodium or potassium or a suitable primary, secondary, or tertiary organic amine.

The coatings formed by the electrodeposition technique of this invention are characterized by being uniform in thickness regardless of the configuration of the article which is coated, consistent in chemical structure because of the uniformity of the block copolymer in terms of molecular weight and position and number of carboxylic acid group on each polymer chain, and easily curable because of the regularity and frequency of vinyl groups pendant to the polymer chains in the aliphatic conjugated diolefin portion of the polymer.

Another advantage obtained by the electrodeposition of the dicarboxylic acid block copolymers according to the teachings of this invention, as opposed to the electrodeposition of the coupled drying oils according to the prior art techniques, is achieved by the low acid number or acid value of the dicarboxylic acid block copolymers. The acid number is the number of milligrams of potassium hydroxide required to completely neutralize one gram of polymer. The electrodeposition of a polymer having a low acid number is desirable because it results in better electrical efficiency during the electrodeposition of the polymer, the use of less neutralizing agent and hence the accumulation of lower amounts of neutralizing ions in the electrodeposition bath, and thicker and more uniform polymer coatings. The dicarboxylic acid block copolymers electrodeposited by this invention have an acid number between about 18 and about 37.

Accordingly, it is an object of this invention to provide a process for electrodepositing a polymeric material from an emulsion system.

Another object of this invention is to provide a method for electrodepositing a polymeric material to provide a uniform coating regardless of the size, shape, or configuration of the article to be coated.

A further object of this invention is to provide a method for electrodepositing a polymeric material which is reproducible in terms of the uniformity and thickness of the coating which is electrodeposited.

Yet another object of this invention is to provide an electrodeposited coating of a dicarboxylic acid of a polymeric material which is tightly adhering, resistant to corrosion, uniform in thickness, and free of ester linkages which if present could hydrolyze and destroy the effectiveness of the coating.

These and other objects of the invention will become apparent to one skilled in the art after studying the following detailed description and the appended claims.

In the practice of this invention, an article to be coated is disposed as an anode in an electrodeposition bath. The walls of the electrodeposition bath can serve as a cathode or separate cathodes can be disposed within the bath if desired. The dicarboxylic acid of the block copolymer of α-methylstyrene and the aliphatic conjugated diolefin is then dispersed in water along with a suitable neutralizing agent such as sodium hydroxide which at least partially neutralizes the block copolymer. The water containing the block copolymer is in the form of an emulsion containing up to about 30 percent by weight of the block copolymer as solids. The emulsion is then charged to the electrodeposition bath and a voltage applied between the article to be coated and the cathode to cause a flow of direct current through the emulsion in the electrodeposition bath. This will result in a migration of the dicarboxylic acid of the block copolymer to the article to be coated and a migration of the sodium ions of the neutralizing agent to the cathode. By monitoring the flow of current through the electrodeposition bath, it is possible to determine when the electrodeposition is complete because of the insulating effect and excellent throwing power which the polymer has after it has become deposited on the article.

While the foregoing description outlines one technique for dispersing the dicarboxylic acid block copolymer and neutralizing agent in water to form an emulsion which is then charged to the electrodeposition bath, the ingredients can be separately charged to the electrodeposition bath, if desired. Similarly, the dicarboxylic acid block copolymer can first be dissolved in a solvent and then blended with water containing the neutralizing agent. In the latter case, when the solvent containing the copolymer is blended with water the copolymer comes out of solution to form an emulsion containing the copolymer in the form of suspended particles.

The dicarboxylic acid block copolymers which are deposited by the electrophoresis method of this invention are described in U.S. Pat. 3,346,666, granted Oct. 10, 1967, the disclosure of which is specifically incorporated herein by reference. The electrodepositable polymeric material is a dicarboxylic acid of a block copolymer of α-methyl styrene and an aliphatic conjugated diolefin having between 4 and 6 carbon atoms per molecule, inclusive. This block copolymer can be illustrated by the formula

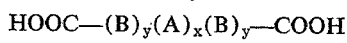

$$HOOC-(B)_y(A)_x(B)_y-COOH$$

wherein A represents a molecule of the α-methyl styrene after it has become a part of the polymer; $x$ is an integer of between 3 and 6, inclusive; each B represents a molecule of the aliphatic conjugated diolefin after it has become a part of the polymer; each $y$ is an integer of between 1 and about 60; and the HOOC— and —COOH portions represent carboxylic acid groups attached to the ends of the polymer. Exemplary conjugated diolefins which can be copolymerized with the α-methyl styrene to form a dicarboxylic acid block copolymer such as by the teachings of Pat. 3,346,666 include butadiene, isoprene, 1,3-pentadiene, dimethylbutadiene, mixtures of the foregoing diolefins, and the like. As indicated with respect to the general formula for the block copolymer, the α-methyl styrene can be present as a trimer, tetramer, pentamer or hexamer.

The degree of polymerization (DP) of the dicarboxylic block copolymers electrodeposited by this invention is defined as the sum total of the number of α-methyl styrene molecules and the number of aliphatic conjugated diolefin molecules in a polymer molecule. The terminal carboxylic acid groups in the block copolymer are not taken into consideration when calculating the DP for a particular block copolymer. Thus, for example, a block copolymer having α-methyl styrene tetramer and 23 molecules of an aliphatic conjugated diolefin on each side of the α-methyl styrene tetramer has a DP of 50.

While Pat. 3,346,666 describes one process for preparing the dicarboxylic acid block copolymers which are electrodeposited by the method of this invention, it is to be understood that this process for preparing the block copolymers is exemplary only and is not intended to be limiting of this invention.

While the conditions for electrodeposition according to the method of this invention are largely a matter of personal choice depending upon such factors as, for example, the size and shape of the article to be coated, the degree of polymerization of the block copolymer, the size and shape of the electrodeposition bath, and the like, it is generally preferred that the electrodeposition bath be maintained at a temperature of between about 40° and about 200° F. The voltage applied between the article to be coated which is the anode and the cathode can be between any minimum operable voltage with a maximum voltage of up to about 300 volts. The pH of the bath is also dependent upon several related factors and is generally between about 7 and about 10.

The degree of polymerization (DP) of the dicarboxylic acid block copolymers employed in the practice of the invention will depend upon the type and nature of the coatings desired and will generally range from a minimum value of about 5 to a maximum value of about 120. The neutralizing agent employed to at least partially neutralize the dicarboxylic acid block copolymer can be any alkali metal hydroxide such as potassium hydroxide or sodium hydroxide. The neutralizing agent can also be any suitable organic amine such as any mono-, di-, or trialkyl amine having up to about 8 carbon atoms in each of the alkyl radicals. Exemplary alkyl amines include mono ethyl amine, diethyl amine, triethyl amine, dioctyl amine, trioctyl amine, dipentylamine, tripentylamine, and the like. The neutralizing agent is employed in an amount sufficient to cause the dicarboxylic acid block copolymer to electrodeposit. If desired, the neutralizing agent can be used in an amount sufficient to cause up to about 100 percent neutralization of the dicarboxylic block copolymer. Generally, the neutralizing agent is used in an amount sufficient to neutralize between about 30 and about 70 percent of the carboxylic acid groups of the block copolymer.

As previously indicated, the vinyl groups pendant to the aliphatic conjugated diolefin portion of the dicarboxylic acid block copolymer chains can be cross-linked to further improve the properties of the coatings. This can be accomplished by heating the article having the electrodeposited coating to a temperature of between about 250° and about 350° F. or higher, if desired.

The electrodepositing method of this invention can be employed to coat the dicarboxylic acid block copolymers on any suitable conductive substrate such as metal or a conductive nonmetallic article. The method of this invention is particularly useful for providing a polymer layer on a metal to protect the metal from the effects of corrosion and the like. Exemplary metal objects which can be coated by the method of this invention include car bodies, containers, metal strips or sheets for use in fabricating cans and the like, evaporator coils and cooling fins, flashing materials for building construction, and the like.

Although the electrodeposition conditions and techniques have been described in considerable detail and with a great deal of particularity, it is evident that conditions other than those specifically described can be employed without departing from the spirit and scope of the invention.

The following examples are illustrative of the electrodeposition method of this invention. It is to be understood that these examples are for the purpose of illustration only and should not be construed as limiting of the invention.

EXAMPLE I

An emulsion for electrodeposition was prepared by dissolving 200 grams of a dicarboxylic acid block copolymer of α-methyl styrene tetramer and 1,3-butadiene (polymerized in the 1,2-position to form pendant vinyl groups by the technique described in Pat. 3,346,666) having a degree of polymerization of 50 in 1500 mls. of tetrahydrofuran by placing the ingredients in an addition funnel.

This solution was then added to a pot containing water at about 150° F. and enough potassium hydroxide to theoretically neutralize the dicarboxylic acid block copolymer completely. The tetrahydrofuran was flashed off thereby producing an emulsion containing the potassium salt of the dicarboxylic acid block copolymer in water. This emulsion was diluted with more water to obtain an emulsion system containing 5 percent by weight solids. The emulsion having the 5 percent by weight solids was charged to an electrodeposition bath and electrodeposited on articles of aluminum, steel, and copper under the influence of an applied voltage of 96 volts.

The excellent throwing power of the dicarboxylic acid block copolymer was proven by inserting a one inch strip of aluminum inside a pipe having an inside diameter of about 2¾ inches. The pipe containing the aluminum strip was immersed in the electrodeposition bath as an anode and a voltage of about 96 volts was applied between the anode and a cathode within the bath. The dicarboxylic acid block copolymer material electrodeposited on the aluminum to provide a coverage of 100 percent in the form of a layer having a thickness of about 0.4 mil.

EXAMPLE II

A dicarboxylic acid block copolymer of α-methyl styrene tetramer and 1,3-butadiene (polymerized in the 1–2 position to form pendant vinyl groups) was solubilized in 100 grams of ethylene glycol n-butyl ether to break up the particles of the polymer. Potassium hydroxide was added in amount sufficient to neutralize about 50 percent of the dicarboxylic acid groups. The dicarboxylic acid block copolymer had a degree of polymerization of about 104. The ethylene glycol n-butyl ether containing the block copolymer and the potassium hydroxide was then added to water with stirring to form an emulsion having about 8 percent by weight solids. The dicarboxylic acid block copolymer was present in the water-ethylene glycol n-butyl ether mixture as finely divided colloidal particles. The mixture was then charged to an electrodeposition bath and electrodeposited separately on several articles under the influence of 96 volts applied between the various articles and a cathode disposed within the electrodeposition bath. Several of the articles coated by the electrodeposition techniques outlined above were removed from the bath and baked in an air circulating oven for ten minutes at a temperature of about 300° F. The resulting coatings were inspected and found to be colorless and clear. The coatings were measured for hardness and found to have a Knoop hardness which ranged between 13 and 16.

Although the invention has been described in considerable detail, it must be understood that such description is for the purpose of illustration only and should not be construed as limiting of the invention.

That which is claimed is:

1. A method of coating an article by electrophoresis comprising the steps of dispersing in an aqueous electrodeposition bath as an aqueous emulsion an at least partially neutralized dicarboxylic acid of a block copolymer of α-methyl styrene and an aliphatic conjugated diolefin having between 4 and 6 carbon atoms per molecule, inclusive, said block copolymer having the formula $$HOOC-(B)_y(A)_x(B)_y-COOH$$

wherein A represents a molecule of the α-methyl styrene after it has become a part of the polymer; x is an integer of between 3 and 6, inclusive; each B represents a molecule of the aliphatic conjugated diolefin after it has become a part of the polymer; each y is an integer of between 1 and about 60; and the HOOC— and —COOH portions represent carboxylic acid groups attached to the ends of the polymer; disposing said article to be coated in said bath as an anode in electrical contact with said aqueous emulsion in said bath and in electrical contact with a cathode in contact with said aqueous emulsion in said bath; and applying a voltage between said article to be coated and said cathode to cause direct current flow through said bath to electrodeposit said dicarboxylic acid of said block copolymer as a film on said article.

2. A method according to claim 1 wherein said block copolymer is a block copolymer of α-methyl styrene tetramer and 1,3-butadiene.

3. A method according to claim 1 wherein said block copolymer is partially neutralized by a neutralizing agent selected from the group consisting of alkali metal hydroxides and organic amines.

4. A method according to claim 1 which includes the steps of removing said article from said bath and heating said article to a temperature of between about 250° and about 350° F. to crosslink said block copolymer.

5. A method according to claim 1 wherein the said block copolymer has a degree of polymerization of between about 5 and about 120, wherein the emulsion contains up to about 30 percent by weight of said block copolymer as solids, wherein said electrodeposition bath is maintained at a temperature of between about 40° and about 200° F., wherein the pH of said electrodeposition bath is between about 7 and about 10, and wherein said voltage applied between said article to be coated and said cathode has a maximum value of up to about 300 volts.

6. A method according to claim 5 wherein the dicarboxylic acid of said block copolymer is neutralized with potassium hydroxide in an amount sufficient to neutralize between about 30 and about 70 percent of the carboxylic acid groups of said block copolymer.

7. A method according to claim 5 wherein the dicarboxylic acid of said block copolymer has an acid number between about 18 and about 37.

8. An aqueous electrodeposition bath composition for electro-coating an anode comprising an aqueous emulsion of an at least a partially neutralized dicarboxylic acid of a block copolymer of α-methyl styrene and an aliphatic conjugated diolefin having between 4 and 6 carbon atoms per molecule, inclusive, said block copolymer having the formula $$HOOC-(B)_y(A)_x(B)_y-COOH$$

wherein A represents a molecule of the α-methyl styrene after it has become a part of the polymer, x is an integer of between 3 and 6, inclusive, each B represents a molecule of the aliphatic conjugated diolefin after it has become a part of the polymer, each y is an integer of between 1 and about 60, and the HOOC— and —COOH portions represent carboxylic acid groups attached to the ends of the polymer.

9. An electrodeposition bath composition according to claim 8 wherein said dicarboxylic acid block copolymer is a block copolymer of α-methyl styrene tetramer and 1,3-butadiene.

10. An electrodeposition bath composition according to claim 8 wherein said aqueous emulsion contains up to about 30 percent by weight solids, wherein the pH of said aqueous emulsion is between about 7 and about 10, wherein said dicarboxylic acid block copolymer has an acid number of between about 18 and about 37, and wherein between about 30 and about 70 percent of the carboxylic groups of said dicarboxylic acid block copolymer are neutralized with a material selected from the group consisting of alkali metal hydroxides and organic amines.

References Cited

UNITED STATES PATENTS

| | | | |
|---|---|---|---|
| 3,346,666 | 10/1967 | Dennis | 260—879 |
| 3,448,017 | 6/1969 | Chang et al. | 204—181 |
| 3,448,027 | 6/1969 | Hart et al. | 204—181 |

DANIEL E. WYMAN, Primary Examiner

W. H. CANNON, Assistant Examiner